Jan. 10, 1961   J. P. FULLAM ET AL   2,967,682
LANDING GEAR SHORTENING MECHANISM
Filed Dec. 8, 1958   3 Sheets-Sheet 1
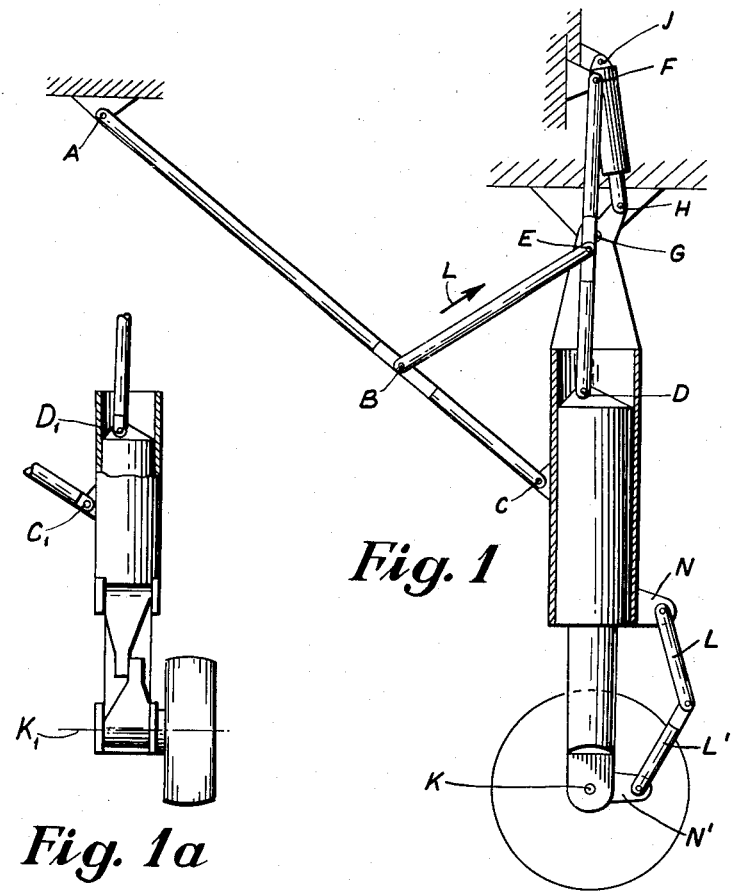
Fig. 1
Fig. 1a
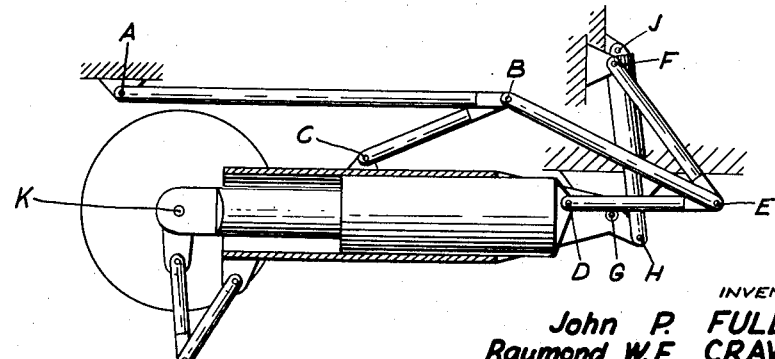
Fig. 2
INVENTORS
John P. FULLAM
Raymond W.F. CRAWLEY
BY
ATTORNEYS

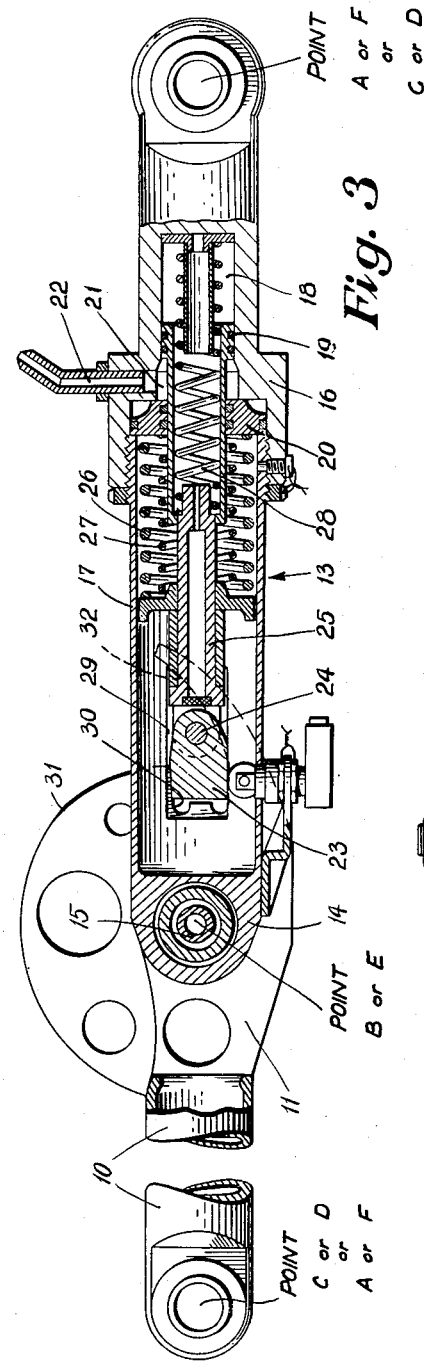
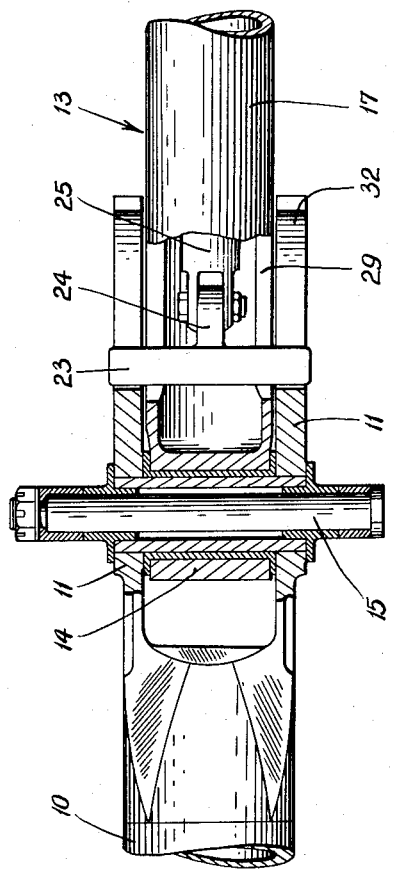

Jan. 10, 1961 J. P. FULLAM ET AL 2,967,682
LANDING GEAR SHORTENING MECHANISM
Filed Dec. 8, 1958 3 Sheets-Sheet 3

INVENTORS
John P. FULLAM
Raymond W.F. CRAWLEY
BY

ATTORNEYS

United States Patent Office 2,967,682
Patented Jan. 10, 1961

2,967,682
LANDING GEAR SHORTENING MECHANISM

John Peter Fullam, Baie d'Urfee, Quebec, and Raymond W. F. Crawley, St.-Laurent, Quebec, Canada, assignors to Jarry Hydraulics, Montreal, Quebec, Canada Filed Dec. 8, 1958, Ser. No. 778,884

2 Claims. (Cl. 244—102)

The present invention relates to a landing gear, which due to its special construction, shortens itself while it is being retracted, so as to allow it to be stowed into a restricted space. The landing gear according to the invention can advantageously be applied to certain airplanes, in order to solve dimensional problems encountered therein.

A particularly advantageous feature of the invention lies in that the shortening is achieved without compressing the shock strut and therefore no energy is stored in the strut while the gear is stowed, this eliminating the static fatigue problems.

The landing gear in accordance with the invention comprises principally a main structure pivotally connected to the aircraft, and a shock strut capsule slidably mounted in the main structure. The position of the shock strut capsule in the main structure is determined by an articulated shortening link, connected to the shock strut capsule and to the aircraft, and having its point of articulation connected by a stabilizer to the point of articulation of a drag stay connected between the aircraft and the main structure. A hydraulically operated retraction actuator connected to the aircraft and to the main structure pivots the main structure in such a direction as to articulate the drag stay, which by means of the stabilizer articulates the shortening link and causes the shock strut capsule to slide in the main structure to shortened position. The invention further comprises a locking device located at the articulation point of either the drag stay or the shortening link, and a cracking means also located at either articulation point, to initiate the articulating movement of either the drag stay or the shortening link. The gear may be locked in retracted position by any conventional means.

The invention will now be described in greater detail with reference to the accompanying drawings, in which like references indicate like elements throughout, and wherein:

Fig. 1 is an elevation of a fore and aft fold landing gear in extended position;

Fig. 1a is a partial elevation of a side fold gear.

Fig. 2 is an elevation of the landing gear of Fig. 1 in retracted position;

Fig. 3 is a longitudinal section of a locking and cracking unit given only by way of example, and which may be used in connection with the landing gear of Figures 1 and 2;

Fig. 4 is a section on line 4—4 of Fig. 3.

Figure 5:
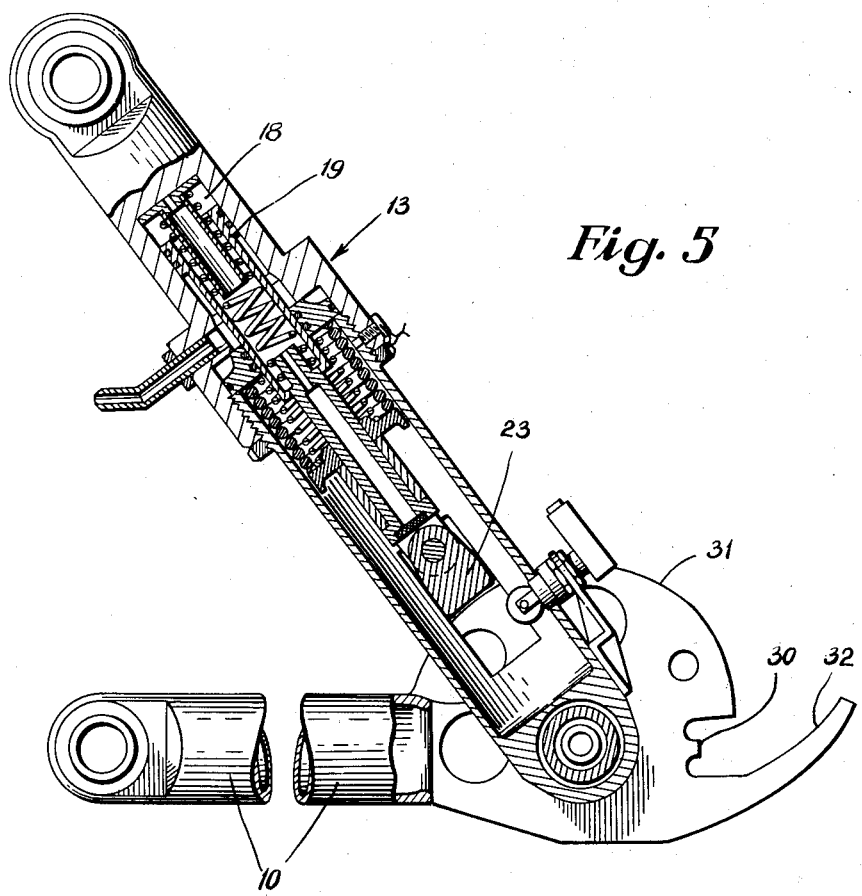
Fig. 5 is a section corresponding to Fig. 3 and showing the unit in articulated position.

It should be noted that the invention resides exclusively in the general structure shown in Figs. 1 or 1a and 2, whereas the construction of Figs. 3–5 is conventional, and has been introduced merely as an example of a locking and cracking device applicable to the landing gear, it being understood that any other suitable locking and cracking means may be used.

In Figures 1 and 2 the various points of articulation are indicated by letters A to K, and the structural elements of the landing gear will be referred to by reference to the articulation points they contain, as follows:

ABC, drag stay
BE, stabilizer
DEF, shortening link
HGC, main structure
DK, shock strut capsule
JH, retraction actuator
AGFJ, aircraft The main structure HGC comprises a tubular housing which is pivotally connected to the aircraft at point G, and having a lever (GH), to the point H of which is connected the hydraulically operated retraction actuator HJ, connected at J to the aircraft.

Within the tubular housing of the main structure HGC is slidably mounted the shock strut capsule DK, which is formed of two telescopic members to the lower one of which is attached the wheel at point K. To the upper point D of the upper telescopic member of shock strut capsule DK is connected one end of the shortening link DEF, which is articulated at E and is connected to the aircraft at F. The conventional shock strut arms L, L' are connected between brackets N, N' of the main structure HGC and the lower member of shock strut capsule DK.

The drag stay ABC is articulated at B and is connected at A to the aircraft and at C to the main structure HGC. Connected near or at point B of the drag stay ABC and near or at point E of the shortening link DEF is the stabilizer BE, which consists of a rigid link.

In the extended position of Fig. 1, either one of the drag stay ABC or the shortening link DEF is rigidly locked in straight position, by means of a locking device of any suitable type, not shown in Fig. 1. Thus the landing gear is kept rigidly in position by the frame defined by points A, G and C.

When it is desired to retract the landing gear to the position shown in Fig. 2, the locking device is unlocked and at the same time either the drag stay ABC or the shortening link DEF is cracked, namely it is slightly articulated, in the direction of arrow L thus pulling or pushing the stabilizer BE and cracking the other of the drag stay or the shortening link. At the same time the retraction actuator HJ is pressurized, and rotates the main structure HGC around point G, thus pushing the drag stay ABC at point C. The drag stay ABC thus pushes the stabilizer at B in the direction of arrow L, and the stabilizer in turn articulates the shortening link DEF, so that the latter pulls at point D on the shock strut capsule DK and draws it up inside the main structure HGC, as the main structure is rotated. The landing gear can then be reextended by reversing the above described operation.

As mentioned above, Figs. 1 and 2 show a fore and aft fold gear. The invention is however fully applicable also to side fold gears, as shown in Fig. 1a wherein points $D_1$, $C_1$, and $K_1$ correspond to points D, C, and K of Figs. 1 and 2.

Figures 3 to 5 show an example of locking and cracking means applicable to the landing gear of Fig. 1. Figure 3 illustrates a detail of what may be either the drag stay ABC or the shortening link DEF. The device may be disposed in either sense; however, it is preferable to place the right side in the figure, adjacent the aircraft, so as to shorten the hydraulic connections.

The unit provided with the locking and cracking means, whichever it may be, comprises a rigid strut 10 which is fork-shaped at one end and comprises two free standing lugs 11 which have bearings for pivotally connecting therebetween another strut 13, one end 14 of which is disposed between lugs 11, and comprises a hole registering with the bearings for the insertion of a pin 15.

Strut 13 is formed of two threadedly assembled parts 16 and 17, part 16 containing a cylinder 18 in which is slidably mounted a piston 19, which extends through a head 20, rigidly assembled in part 16, and defining therewith a fluid chamber 21. Thus the hydraulic fluid in chamber 21 may be pressurized through a nipple 22, to move piston 19 towards the right of Fig. 3.

A latch 23 is pivotally connected at 24 to a latch rod 25 rigid with the piston 19, and urged by springs 26 and 27 towards the left of Fig. 3, namely in a direction opposite the direction in which the hydraulic fluid in fluid chamber 21 tends to move piston 19, rod 25 and latch 23. A piston return spring 28 is provided to evacuate the fluid from cylinder 21, when said cylinder is depressurized. Latch 23 extends externally of part 17 through two opposite slots 29, and is adapted to engage a locking slot 30 in the two lugs 11.

Adjacent the locking slot 30, lugs 11 present to one side, guide surfaces 31 in the form of semi-circles concentric with pin 15, and on the other side two cams 32, which curve upwardly into the path of the latch 23.

The unit operates as follows: in the extended position, as in Figures 3 and 1, springs 26 and 27 urge the latch 23 into the locking slot 30, to lock the unit. When "gear up" is selected, the fluid in chamber 21 is pressurized to move the latch 23 out of the locking slot 30, this unlocking the whole system, and as the latch 23 continues its stroke, it strikes the cams 32, which cracks the unit. When cracking has occurred, further articulation is obtained by the retraction actuator HJ, as explained above, and the cylinder 21 may be depressurized, whereby the latch will slide along the guide surfaces 31, as shown in Fig. 5. It is evident that when the landing gear is extended, the latch 23 will lock automatically, when extended position is reached, due to the action of springs 26 and 27.

It may be pointed out again that the unit shown in Figures 3 to 5 is disclaimed as constituting part of the invention, and that it has been illustrated and described merely to demonstrate the operativeness of the landing gear of Figs. 1, 1a and 2.

It is understood that the invention is not limited to the embodiment illustrated and described, but embraces all the embodiments which may be within the spirit and scope of the appended claims.

We claim:

1. In an aircraft, a landing gear shortening mechanism comprising a main structure pivotally mounted on the aircraft, actuating means mounted between the aircraft and said main structure for pivoting said main structure between an extended and a retracted position, a shock strut capsule having two telescopic members the upper one of which is slidable mounted in said main structure for movement longitudinally thereof, arms connecting the lower one of said telescopic members with said main structure, an articulated stay connected between said main structure and the aircraft, an articulated shortening link connected between the upper end of said upper telescopic member of said shock strut capsule and the aircraft, a stabilizer pivotally connected between said stay and said shortening link at points near the articulation points of said stay and said shortening link, cracking means connected to either one of said stay and said shortening link, and locking means connected to either one of said stay and said shortening link.

2. In an aircraft, a landing gear shortening mechanism comprising a main structure pivotally mounted on the aircraft, actuating means mounted between the aircraft and said main structure for pivoting said main structure between an extended and retracted position, a shock strut capsule having two telescopic members the upper one of which is slidably mounted in said main structure for movement longitudinally thereof, arms connecting the lower one of said telescopic members with said main structure, an articulated stay connected between said main structure and the aircraft, an articulated shortening link connected between the upper end of said upper telescopic member of said shock strut capsule and the aircraft, a stabilizer pivotally connected between the articulation points of said stay and said shortening link, and cracking and locking means at the articulation point of either one of said stay and said shortening link.

References Cited in the file of this patent

UNITED STATES PATENTS

| | | |
|---|---|---|
| 2,534,962 | Flurscheim | Dec. 19, 1950 |

FOREIGN PATENTS

| | | |
|---|---|---|
| 610,698 | Great Britain | Oct. 19, 1948 |